United States Patent [19]

Yamamoto et al.

[11] Patent Number: 5,168,188
[45] Date of Patent: Dec. 1, 1992

[54] CANNED MOTOR BEARING HAVING AN INTEGRALLY FORMED LOAD SIDE BEARING BRACKET AND END PLATE

[75] Inventors: Masakazu Yamamoto; Hiromi Sakacho; Seiichirou Yamada, all of Tokyo, Japan

[73] Assignee: Ebara Corporation, Tokyo, Japan

[21] Appl. No.: 728,678

[22] Filed: Jul. 12, 1991

[30] Foreign Application Priority Data

Jul. 13, 1990 [JP] Japan ................... 2-184279

[51] Int. Cl.$^5$ ............................ H02K 5/10
[52] U.S. Cl. ..................... 310/104; 310/86; 310/87
[58] Field of Search ............ 310/86, 87, 104, 266

[56] References Cited

U.S. PATENT DOCUMENTS

| 4,780,953 | 11/1988 | Wheeler et al. | 310/87 |
| 4,933,581 | 6/1990 | Shramo | 310/86 |

FOREIGN PATENT DOCUMENTS

| 1097543 | 1/1961 | Fed. Rep. of Germany | 310/87 |
| 2207647 | 8/1973 | Fed. Rep. of Germany | 310/87 |
| 1322867 | 2/1963 | France | 310/86 |
| 1432842 | 2/1966 | France | 310/86 |

Primary Examiner—Steven L. Stephan
Assistant Examiner—Matt Nguyen
Attorney, Agent, or Firm—Nikaido, Marmelstein, Murray & Oram

[57] ABSTRACT

A canned motor equipped with a stator chamber, a load side bearing bracket and an opposite side bearing bracket on the load side and opposite side of the stator chamber. The stator chamber is formed by integrally welding a stator core, an outside can, an inside can, a load side end plate and opposite side end plate. The load side bearing bracket and the opposite side bearing bracket each includes a bearing boss supporting a radial bearing and a shaft seal thereon. The improvement consists of the end plate and the bearing bracket on the load side being integrally formed to provide a single shell structure and the inside can being welded to the bearing boss of the load side bearing bracket. By this arrangement, the number of components required for the motor is reduced, axial length of the motor is shortened and heat radiation from the end surface of the stator chamber on the load side is enhanced.

6 Claims, 2 Drawing Sheets

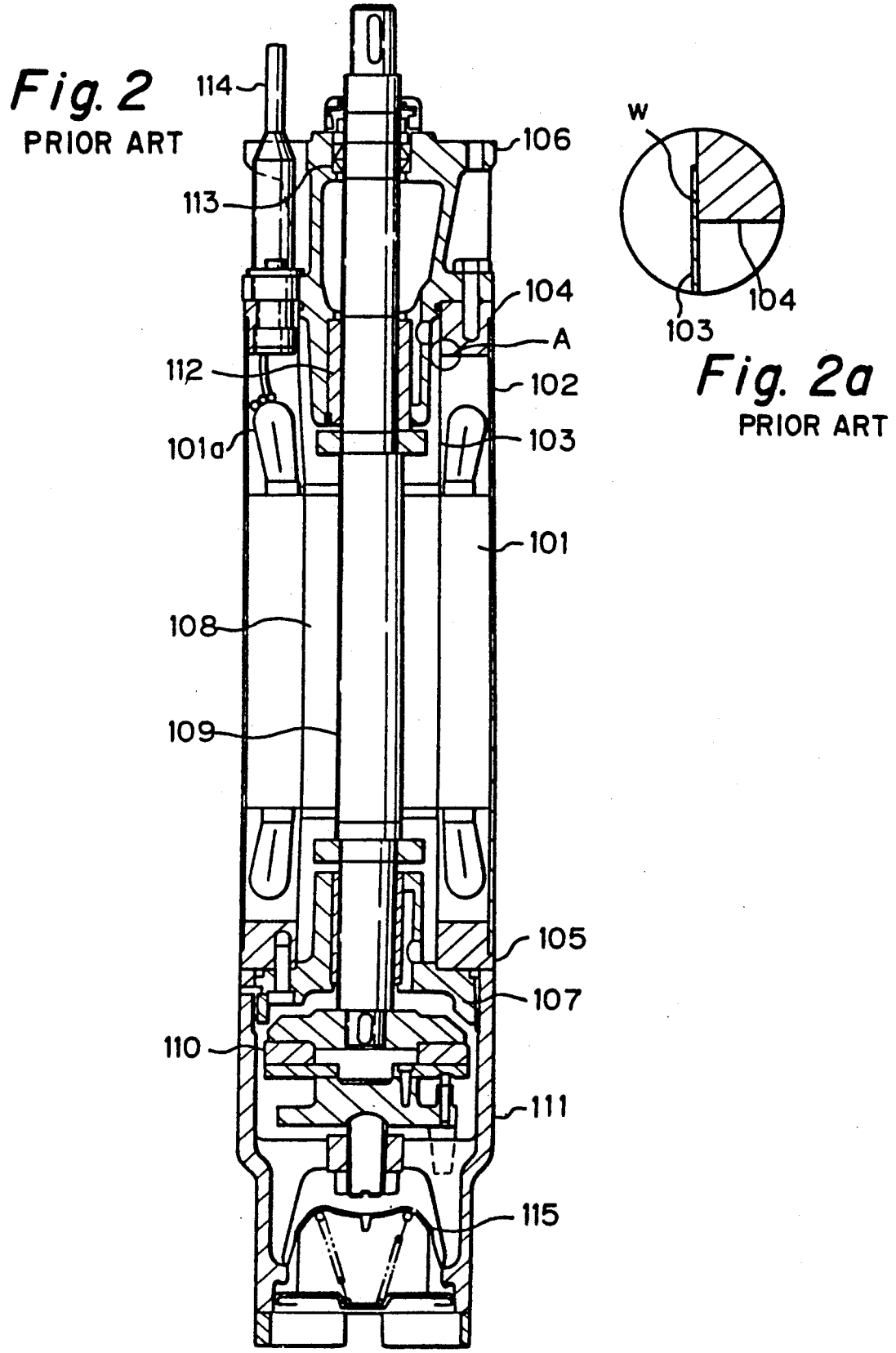

CANNED MOTOR BEARING HAVING AN INTEGRALLY FORMED LOAD SIDE BEARING BRACKET AND END PLATE

BACKGROUND OF THE INVENTION

1. Field of the Invention

The present invention relates to a canned motor wherein a thin anticorrosive cylindrical liner or can is inserted inside a motor stator to insulate the stator from a liquid, and is particularly concerned with the structure of a stator chamber of the canned motor.

2. Prior Art

Shown in FIG. 2 is a prior art canned motor for use in a deep well pump. The canned motor is ready for mounting a pump body or load (not indicated) on an upper shaft end in the illustration. The motor includes a stator chamber constructed integrally by welding a stator core 101, a frame or outside can 102, an inside can 103, a load side (power cable extraction side) end plate 104 and a counter load side end plate 105, bearing brackets 106 and 107 mounted on a load side and a counter load side of the stator chamber respectively, a rotor 108 and a shaft 109 constituting a rotator, a lower thrust bearing 110 for supporting the rotator axially, and a thrust bearing case 111 for containing the thrust bearing 110 therein, wherein the inside can 103 mounted inside the stator is fitted in an inside peripheral portions of the load side and the counter load side end plates 104 and 105 respectively and welded thereto as shown by w in FIG. 2a.

A radial bearing 112 and a shaft seal 113 for sealing a liquid (pure water, etc.) enclosed in the motor from contact with an external fluid are mounted on the upper load side bearing bracket 106, and a suction casing of the pump (not indicated) is mounted on an upper portion of the bearing bracket 106. Further, a mounting area for a power cable 114 is provided on the load side end plate 104 of the stator chamber and the bearing bracket 106.

On the other hand, a diaphragm 115 for absorbing expansion and contraction corresponding to a change in temperature of a liquid enclosed in the motor is mounted on the lower portion of the thrust bearing case 111.

However, in the prior art canned motor described above, since the load side bearing bracket 106 and the counter load side bearing bracket 107 for mounting the bearings are provided on the load side end plate 104 and the counter load side end plate 105 of the stator chamber forming a stator assembly respectively, the following problems inevitably arise.

(i) The number of components for fabricating a motor is increased and, therefore, it is difficult to make the motor compact and an assembling of the motor is troublesome.

(ii) While provision of sufficient space for connecting the cable 114 and a stator winding 101a is necessary within the stator chamber on the load side or the power cable extraction side, space in the stator chamber is limited by the provision of the end plate 104, and thus the stator chamber must be elongated axially so as to secure sufficient space for connecting the winding 101a and the power cable 114, and, therefore, a motor size is increased in an axial direction.

(iii) Since the bearing brackets 106 and 107 are interposed on the load side and the counter load side of the stator assembly respectively, satisfactory heat radiation from the opposite ends of the stator chamber cannot be expected, and hence a cooling of the canned motor depends substantially on the radiation from an outer peripheral surface of the stator chamber only.

SUMMARY OF THE INVENTION

The present invention is directed to the solution of the aforementioned problems inherent in the prior art, and an object of the present invention is to provide a canned motor equipped with a stator chamber wherein the number of components required for fabricating a motor is reduced, a space for connecting a stator winding and a power cable can be sufficiently secured without the need for elongating a stator chamber axially, and good heat radiation can be expected from the load side end of the stator assembly.

In order to attain the aforementioned object, the present invention is characterized in that an end plate on a load side or a power cable extraction side forming a stator chamber of the canned motor is structured integrally with a bearing bracket for supporting a rotor and a shaft thereon, and a stator inside can is welded to an inward end portion of a bearing boss of the bearing bracket on the load side. A power cable extraction port may be provided in one part of a space between the end plate on the load side integrally formed with the bearing bracket and a coil end surface of the stator coil.

Since the present invention is constructed as described above, an end plate and a bearing bracket on the load side are made from a single component and no fastening means therefor is needed. Thus, the number of components for fabricating a canned motor is reduced which enables the motor to be made compact by way of a simple assembly operation. Also, heat generated from the stator chamber at the time of operation is radiated externally (to an external fluid) directly through a single shell structure on the power cable extraction side (load side) which is formed by the end plate and the bearing bracket. Accordingly heat radiation is enhanced.

Further, since a stator inside can is mounted by means of welding on an inward end portion of the bearing boss of the bearing bracket, a distance between a stator core end surface and the can weld zone is shortened and the can is thus reduced in length. Further, since a space between the uppermost portion of the end plate formed integrally with the bearing bracket and a stator coil end portion can be made relatively wide, a space for providing power cable extraction port and for connecting the power cable with the stator coil can easily be obtained without elongating the stator chamber in an axial direction.

The above and other objects, features and advantages of the present invention will become more apparent from the following description when taken in conjunction with the accompanying drawings in which a preferred embodiment of the present invention is shown by way of illustrative examples.

BRIEF DESCRIPTION OF THE DRAWINGS

FIG. 2 is a longitudinal sectional view exemplifying a prior art; and

FIG. 2a is an enlarged sectional view of a section A of FIG. 2.

DETAILED DESCRIPTION OF THE PREFERRED EMBODIMENTS

Figure 1:
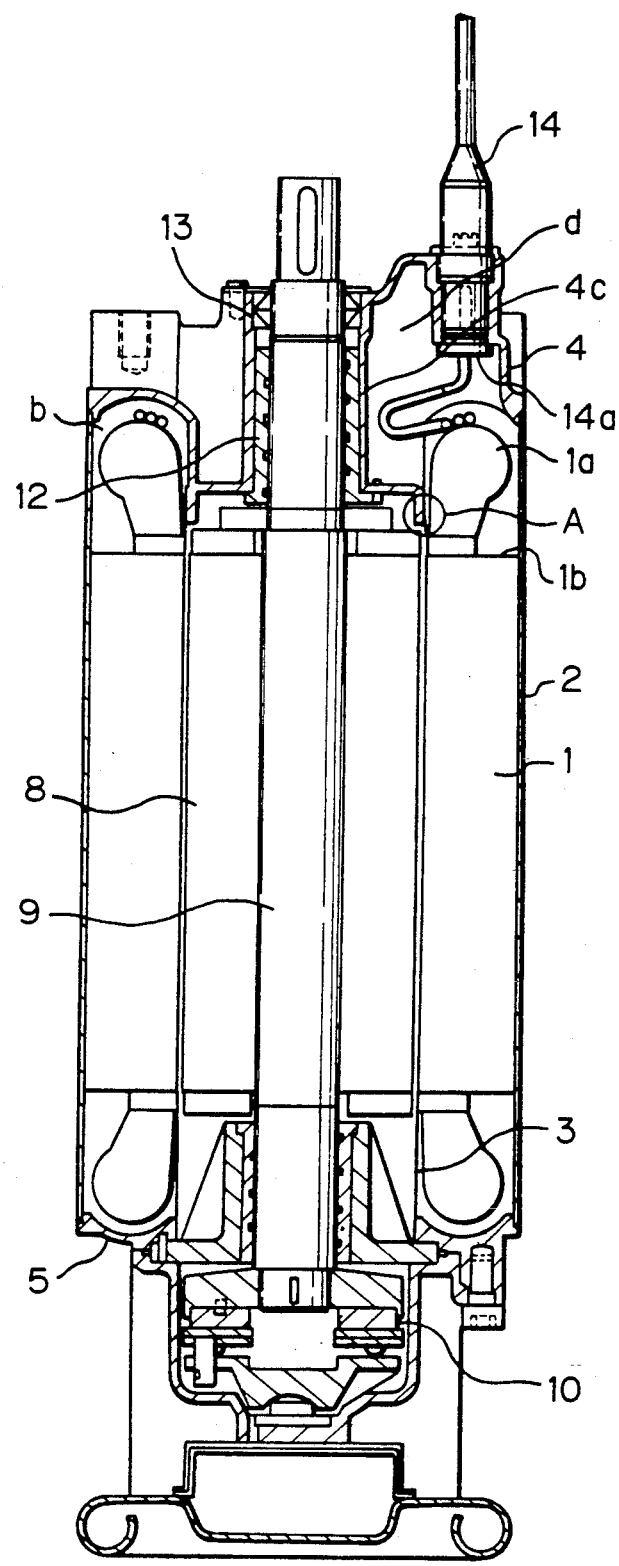
FIG. 1 is a longitudinal sectional view of a canned motor given in one embodiment of the present invention.

Next, a preferred embodiment of the present invention will be described with reference to the accompanying drawings. FIG. 1 is a longitudinal sectional view of a canned motor given in one embodiment of the present invention.

In the illustration, a stator chamber is constructed integrally from a stator core 1, a frame or outside can 2, an inside can 3, a load side (power cable extraction side) end plate 4 and a counter load side end plate 5 through welding each. However, the load side end plate 4 is structured integrally with the prior art bearing bracket (106 in FIG. 2), and a mounting area of a power cable 14 is provided at an upper corner portion thereof and a bearing boss 4c supporting a radial bearing 12 and a shaft seal 13 is provided at a central portion thereof.

Figure 1A:
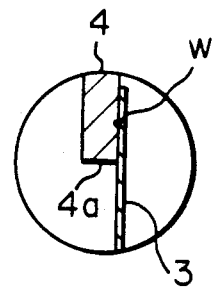
FIG. 1a is an enlarged sectional view of a section A of FIG. 1.

Then, as shown in FIG. 1a in magnification, the load side end plate 4 and the inside can 3 are mounted together by having the inside can 3 fitted and welded w on an outer peripheral portion of a cylinder 4a provided on an inner end portion of the bearing boss 4c of the bearing bracket formed integrally with the load side end plate 4.

Further, the load side end plate 4 forms an upper coil chamber b on an upper portion of the stator chamber, and a portion of which is expanded radially inward and upward as far as an outer peripheral portion of the bearing boss 4c, to provide an expanded space d for providing an extraction port 14a of the power cable 14 therein. Then in the illustration, a reference numeral 8 denotes a rotor, 9 denotes a shaft, and 10 denotes a thrust bearing.

As described above, according to the embodiment shown, since the end plate 4 on the load side or the power cable extraction side is structured integrally with the bearing bracket so as to have a single shell structure, the number of components for fabricating a canned motor can be reduced, and thus a miniaturization of the motor is possible, and heat is radiated axially directly from the end plate 4 in single shell structure to enhance a radiation effect.

Further, the inside can 3 is fitted and welded w on the outer peripheral portion of the lower end cylinder 4a of the bearing boss 4c formed integrally with the load side end plate 4, therefore a distance between a stator core end surface 1b and the weld zone w can be shortened, and thus the inside can 3 can be reduced in length.

Then, the space d between the uppermost portion of the end plate 4 on the load side and the core end surface 1b can be expanded radially inward as far as the bearing boss 4c so as to have relatively wide space, therefore the space d is available to provide the power cable extraction port 14a therein and also to provide a connection between the cable 14 and a stator winding 1a therein. Further, since the length of the stator chamber can be reduced in an axial direction, not only the motor can be miniaturized but also the cooling effect of the motor can be enhanced.

The load side end plate is preferably fabricated by means of precision casting, however, it is not necessarily limited thereto, and press forming may also be employed.

As described in detail above, according to the embodiment shown, the following effects will be obtained:

(i) Since the end plate on a load side or a power cable extraction side forming a stator chamber of the canned motor is structured integrally with the bearing bracket supporting a rotor and a shaft thereon, components for fabricating a canned motor can be reduced and assembling is made simple, a heat radiation from the end surface of the stator chamber on the power cable extraction side can be enhanced.

(ii) Since the inside stator can is mounted by means of welding on the outer periphery of an inward end portion of the bearing boss of the bearing bracket, a distance between the stator core end surface and the can weld zone can be shortened, therefore the can length can be made small.

(iii) Further, a space between the end plate on the power cable extraction side which is integrally formed with the bearing bracket and the stator core end surface is relatively wide, therefore, the space can be used not only for providing a power cable extraction port therein, but also for connecting the power cable with the cable winding therein, without increasing an axial length of the motor, and thus the motor can be made small.

In the above described embodiment, while the description has referred to the structure wherein the end plate and the bearing bracket on only the load side are formed integrally to form a single shell structure, the invention is not necessarily limited thereto, and end plate and the bearing bracket on the counter load side may further be formed integrally to form a single shell structure, and the inside can may be welded to the bearing boss of the counter load side bearing bracket.

What is claimed is:

1. A canned motor, comprising:
   a stator chamber;
   a load side bearing bracket and a counter load side bearing bracket disposed on a load side and a counter load side of the stator chamber, respectively,
   said stator chamber including an integrally welded stator core, an outside can, an inside can, a load side end plate and a counter load side end plate,
   each of said load side bearing bracket and counter load side bearing bracket including a bearing boss for supporting a radial bearing and a shaft seal thereon,
   said end plate and said bearing bracket on the load side of the stator chamber being integrally formed to provide a single shell structure, and said inside can being welded to said bearing boss of the load side bearing bracket;
   wherein a space between said load side end plate and a coil end surface of said stator coil is expanded radially inwardly as far as the outside of said bearing boss, and a power cable extraction port is provided in one said part of said space.

2. The canned motor as defined in claim 1, wherein said inside can is mounted by means of welding from an outer periphery on an inward end portion of said bearing boss of said load side bearing bracket.

3. The canned motor as defined in claim 2, wherein said bearing boss includes a cylinder at the lower end thereof and said inside can is fitted and welded on said cylinder.

4. The canned motor as claimed in claim 1, wherein connection between said power cable and said stator coil is effected in said space.

5. The canned motor as claimed in any of claims 1, 2, 3, or wherein said single shell structure comprising said end plate and said bearing bracket on the load side is fabricated by means of precision casting or press forming.

6. The canned motor as claimed in claim 5, wherein further said end plate and said bearing bracket on the counter load side are formed integrally to provide a single shell structure, and said inside can is welded to said bearing boss of said counter load side bearing bracket.

* * * * *

UNITED STATES PATENT AND TRADEMARK OFFICE
CERTIFICATE OF CORRECTION

PATENT NO. : 5,168,188
DATED : December 1, 1992
INVENTOR(S) : Masakazu YAMAMOTO et al It is certified that error appears in the above-identified patent and that said Letters Patent is hereby corrected as shown below:

On the title page, Item [54], line 1, delete "BEARING".

Signed and Sealed this

Twenty-sixth Day of October, 1993

Attest:

BRUCE LEHMAN

Attesting Officer

Commissioner of Patents and Trademarks